United States Patent
Dulgerian et al.

(10) Patent No.: US 7,334,726 B2
(45) Date of Patent: Feb. 26, 2008

(54) PERSONAL INFORMATION MANAGEMENT SYSTEM

(75) Inventors: James Dulgerian, Troy, MI (US); Scott Meesseman, Warren, MI (US); Charles William McDowell, Stow, OH (US)

(73) Assignee: Alps Electric Co., Ltd., Tokyo (JP)

(*) Notice: Subject to any disclaimer, the term of this patent is extended or adjusted under 35 U.S.C. 154(b) by 0 days.

(21) Appl. No.: 11/182,730

(22) Filed: Jul. 15, 2005

(65) Prior Publication Data

US 2007/0164104 A1    Jul. 19, 2007

Related U.S. Application Data

(60) Provisional application No. 60/678,904, filed on May 6, 2005.

(51) Int. Cl.
*G06K 5/00* (2006.01)
(52) U.S. Cl. .................... 235/382; 235/472.03
(58) Field of Classification Search .............. 235/375, 235/380, 382, 382.5, 472.01, 472.02, 472.03
See application file for complete search history.

(56) References Cited

U.S. PATENT DOCUMENTS 5,825,002 A * 10/1998 Roslak .................. 235/375
2004/0149827 A1 * 8/2004 Zuili ..................... 235/439

OTHER PUBLICATIONS

International Search Report for International Application No. PCT/US06/17451.

* cited by examiner

*Primary Examiner*—Karl D. Frech
(74) *Attorney, Agent, or Firm*—Brinks Hofer Gilson & Lione

(57) ABSTRACT

A personal information management system stores associations between a user and the user's mobile hand held electronic and communication devices. The system receives input indicating the presence of the user and bonds with the mobile hand held devices associated with the identified user to the exclusion of other devices. Once the system has bonded to the user's mobile hand held devices, the user may access data stored on and control functions of the various hand held devices through a single common interface, the system may be used to place and receive cellular telephone calls, send and receive text messages, and record and play back audio messages.

21 Claims, 8 Drawing Sheets

PERSONAL INFORMATION MANAGEMENT SYSTEM

PRIORITY CLAIM

This application claims the benefit of priority from U.S. Provisional Application No. 60/678,904 filed May 6, 2005, which is incorporated herein by reference.

TECHNICAL FIELD

The present invention relates to a personal information management (PIM) system. In particular, the invention relates to a personal information management system that is suited for use in a vehicle.

BACKGROUND

Portable electronic devices are ubiquitous. Cell phones, personal digital assistants (PDAs), wireless email terminals, digital music players, global positioning systems (GPS) and the like are seemingly everywhere. It is not uncommon for individuals to carry multiple handheld devices, each device performing one or more different functions. Despite their different functions, however, many hand held devices often store overlapping data. For example, one function of a cell phone is to place and receive telephone calls over a wireless communications network. Some functions of a PDA are to organize the user's calendar, store contacts and contact information, keep track of "To Do" lists, store personal memos, and the like. Despite their disparate functions, cell phones and PDAs may store a fair amount of common data, such as duplicate contact lists and telephone numbers. Even though both devices carry much of the same information a user must nonetheless carry both devices in order to take advantage of all their diverse functionality.

Another difficulty with some hand-held electronic and communication devices is their size. Some mobile devices are made small so that they are easily portable. In some cases smaller is better. However, a small product envelope has an adverse impact on the product's interface. A smaller size means smaller, more closely spaced buttons and a smaller display area. Small, densely packed buttons are more difficult to manipulate and smaller display areas are harder to read. Such small interfaces require a user's full undivided attention in order to navigate the various functions offered by such products. Searching contacts lists, dialing phone numbers, opening emails, sending text messages, writing notes to one's self, and similar activities can be difficult, possibly dangerous, if attempted while performing other complex tasks, such as driving a vehicle.

A personal information management system providing a single common interface for accessing and controlling a plurality of remote hand held electronic devices in a safe efficient manner is greatly desired. Preferably such a personal information management system should be capable of communicating with multiple devices and identifying the appropriate hand held devices with which to communicate and control, while ignoring hand held devices belonging to people other than the desired user.

SUMMARY OF THE INVENTION

The present system allows a user to access data stored on multiple portable devices and to control the functions of multiple hand held devices such as cell phones, PDAs, wireless email terminals, and the like, through a common interface, the system stores one or more associations between a known system user and specific mobile hand held devices. An input device receives information verifying the identity of the user, and the system attempts to establish a communication link with all of the mobile hand held devices associated with the identified user, while excluding communications with all other devices that may be present and capable of communicating with the system. In an embodiment the personal information management system is installed in a vehicle. A user's presence is verified via a unique identification code received by the vehicle's remote keyless entry (RKE) system from a corresponding RKE key.

The personal information management system allows a user to compose short message service (SMS) text messages in advance and store them on the system for later use. At a later time the user may access the pre-recorded text messages and cause the pre-recorded messages to be sent to designated recipients via an external cell phone. The messages are selected, addressed and caused to be transmitted through the personal information management system's common interface. Thus, the user need not actually manipulate the cellular phone in order to send the text messages.

Another aspect allows a user to create and store audio memos. The personal information management system interface includes a microphone which a user may use to record verbal notes and reminders to himself or herself. The system stores the audio memos as digital wav files using a standard naming convention. The interface displays the titles of the various memos that the user has recorded so that the user may select various audio memos to be played back from time to time. The audio memos are played back over a loud speaker associated with PIM's common interface.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the appended claims.

DETAILED DESCRIPTION OF THE INVENTION

A personal information management system provides a common interface through which a user may access, control, and operate a plurality of otherwise independent external mobile devices. The system is especially well suited for use in environments such as in the cockpit of an automobile or other vehicle where the vehicle operator will have limited use of his or her hands and may be unable to focus all of his or her attention on the individual interfaces of one or more different hand held devices. The system allows the user to interact with the mobile devices, taking advantage of some or all of the functions provided by the hand held devices, while focusing much of his or her attention elsewhere.

Figure 1:
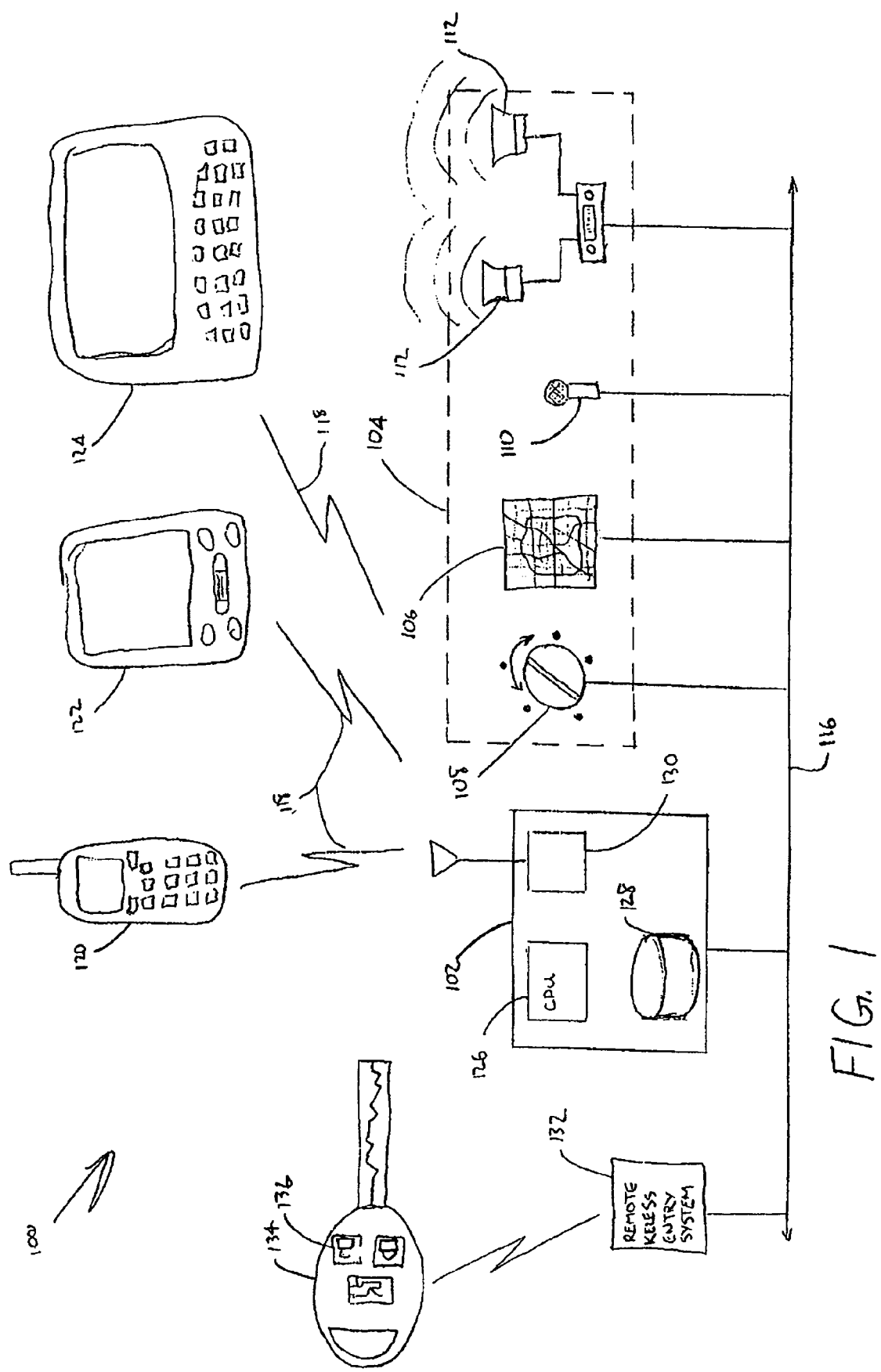
FIG. 1 is a block diagram of a personal information management system.

A personal information management system 100 is shown in FIG. 1. System 100 includes a plurality of interface components which collectively form a user interface 104. The interface components may be coupled to an automobile's instrument panel at various locations convenient to the driver. The user interface 104 includes audio and visual output devices such as a visual display 106, and one or more speakers 112. Input devices include a multi-function selector switch 108 and a microphone 110. Other input and output devices may be provided depending on the requirements of the devices, the functions that the system 100 is intended to control, and the environment in which the system is placed.

As shown, individual components of the interface 104 communicate with a central control module 102 via a communication bus 116. Communication bus 116 may be a vehicle's central instrument bus and may provide communication between additional components on the vehicle which are not part of the personal information management system 100. Alternatively, the interface components may connect directly to the central control module 102. When the system is installed in an automobile or other vehicle, the interface components may be integrated with other systems and components onboard the vehicle. For example, audio output to the speakers 112 may be provided through the vehicle's audio system 114 and the speakers 112 themselves may be the audio system's main output speakers. The visual display 106 may be integrated with other information systems onboard the vehicle such as an onboard computer and navigation system. The communication bus 116 may extend to a Remote Keyless Entry (RKE) system 132. In this case, data from the RKE system can be shared with the central control module 102 over the communication bus 116.

The central control module 102 includes a CPU 126, a data storage device 128, and a wireless communications module 130. The wireless communication module 130 provides a wireless communication link 118 between the central control module 102 and one or more mobile hand held devices, such as a cellular telephone 120, a personal digital assistant (PDA) 122, a hand-held wireless email terminal 124, or some other hand-held mobile device. Communication module 130 may be a Bluetooth communication module which is adapted to communicate wirelessly with other Bluetooth enabled devices. In this case the cellular phone 120, the PDA 122 and the wireless email device 124 will all be Bluetooth enabled devices capable of communicating with the central control module 102 over the wireless communication link 118 using the Bluetooth communication protocol. Alternatively, communication link 118 may be provided by a wireless protocol other than Bluetooth if desired. System 100 simply requires that both the central control module 102 and compatible mobile hand held devices support a common wireless communication protocol that allows the central control module 102 to interact with and control the external devices over the common wireless communication link 118.

Application programs resident on the central control module 102 and on the mobile devices allow the control module 102 to communicate with and control some or all of the functions of the mobile devices. For example, the central control module 102 may have the ability to extract the calendar, contact, and task list information stored on a PDA based on instructions sent from the central control module 102 over the wireless link 118. The PDA may also transmit the requested data back to the central control module 102 via the wireless link 118. The central control module 102 may then save the data in the memory storage device 128 where it may be more readily accessed by the central control module 102 and presented to the user in response to user requests for information.

In another example, the central control module 102 may control a cell phone 120. The central control module 102 may initiate a call, sending the dialing instructions to the hand-held phone over the wireless link 118. Furthermore, once a connection is established, voice data associated with the call may be routed through the central control module 102 via the wireless link 118. Thus, the user may speak into the microphone 110 associated with the information management system interface 104. The outgoing voice data is carried via the vehicle's communication bus 116 to the central control module 102, which sends the outgoing voice data to the cell phone 120 via the wireless link 118. The cell phone 120 then transmits the voice data to a remote party over a cellular network as in a traditional cellular call. Similarly, the cell phone 120 receives voice signals from a remote party over the cellular network and forwards the voice data to the central control module 102 via the wireless link 118. The central control module 102 may then cause the voice data to be played over the speakers 112.

System 100 allows a user to operate a cellular phone 120, a PDA, 122, a wireless email terminal 124, or other external mobile devices without manipulating the actual devices themselves. The above examples are but two of the ways in which the central control module 102 may access data and control the functions of external mobile devices. Of course, the actual data that can be accessed from a hand held device and the functions that can be implemented on the hand-held device will vary depending on the capabilities of the hand-held device and the relevant application programs resident on the control module 102 and on the individual hand held devices themselves.

A potential problem may arise when there are multiple hand held devices present belonging to more than one user, but all of which are capable of communicating with the control module 102 over the wireless link 118. For example, if the communication link 118 is a Bluetooth communication link, the owner of the vehicle may have a Bluetooth enabled cell phone and a Bluetooth enabled PDA. A passenger riding in the vehicle may also happen to have a Bluetooth enabled cell phone and PDA. Under these circumstances, the control module 102 may have difficulty determining which hand-held devices to communicate with and control. To complicate matters further, there may be multiple people who use the vehicle at different times, each having their own Bluetooth enabled external mobile devices. For example, if the vehicle is a family car, both husband and wife may be using the car at different times. Each may have their own compatible hand held devices which they may want to access and control while using the car. The control module 102 must be capable of determining which handheld devices to bond with depending on who is driving the car and which hand held devices are present in the vehicle.

The system 100 may solve this problem by forming associations between known users of the system 100 and their corresponding hand held devices. When the central control module 102 receives indication that a particular user is present or desiring to use the system, the central control module 102 attempts to bond (i.e. communicate with and control) the hand held devices associated with that user, to the exclusion of all other compatible hand held devices that may also happen to be present.

Figure 2:
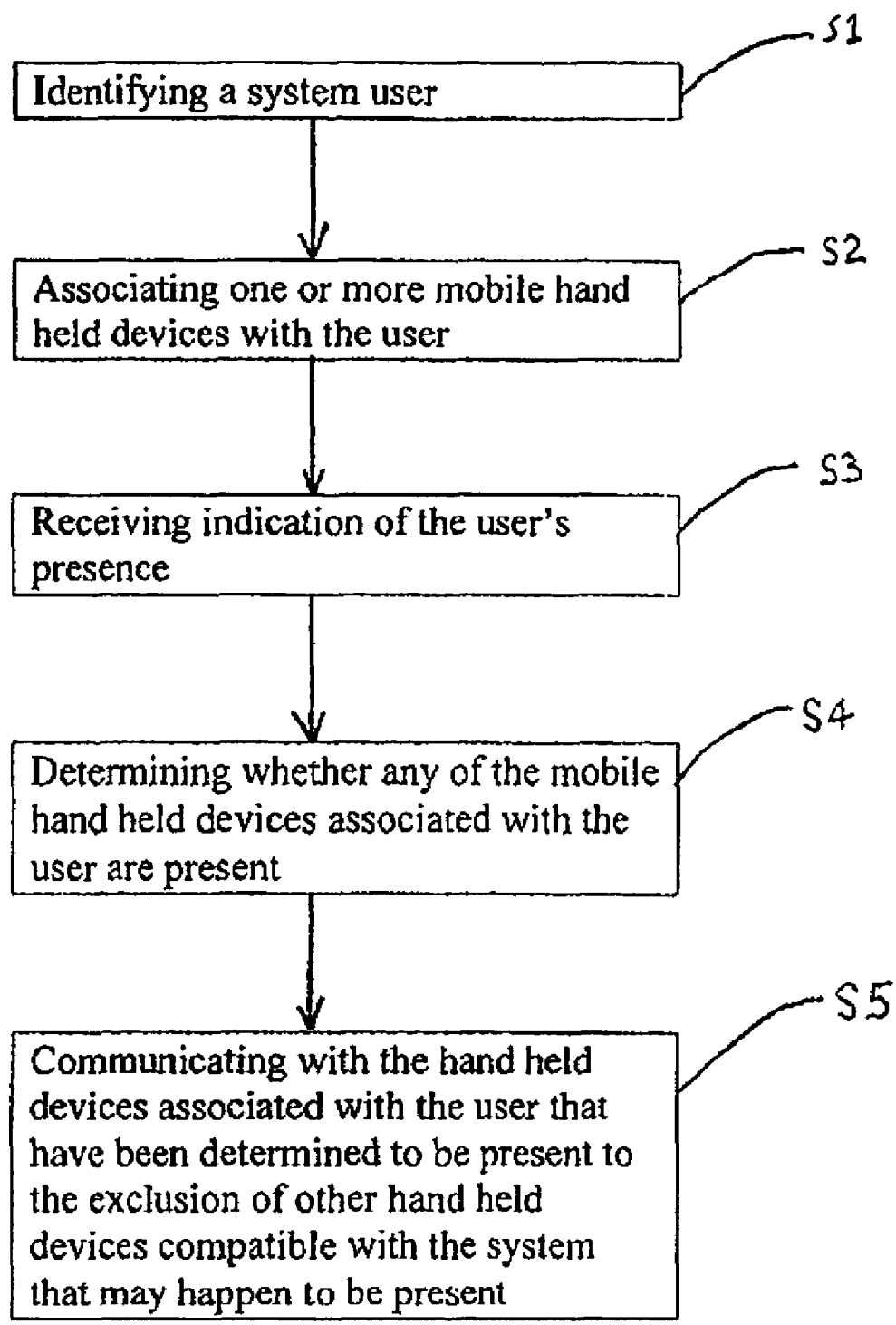
FIG. 2 is a flow chart showing the process for bonding with the hand held devices.

FIG. 2 shows a flow chart of the bonding process between the personal information management system and a user's mobile hand held devices. The first act S1 is to identify a system user. The second act S2 is to associate the user's mobile hand held devices with the user. These associations may be stored in the data storage device 128 in the central control module 102. The next act S3 is to receive indication of the user's presence or desire to use the system. As will be described in more detail below, this may be provided by, for example an identification code received with the RF signal from a remote keyless entry system key. Once it has been determined that the user is present and desires to use the system, the system determines whether any of the mobile hand held devices associated with the user are present in act S4. Finally, in act S5 the system bonds with those of the user's mobile hand held devices that happen to be present.

Figure 3:
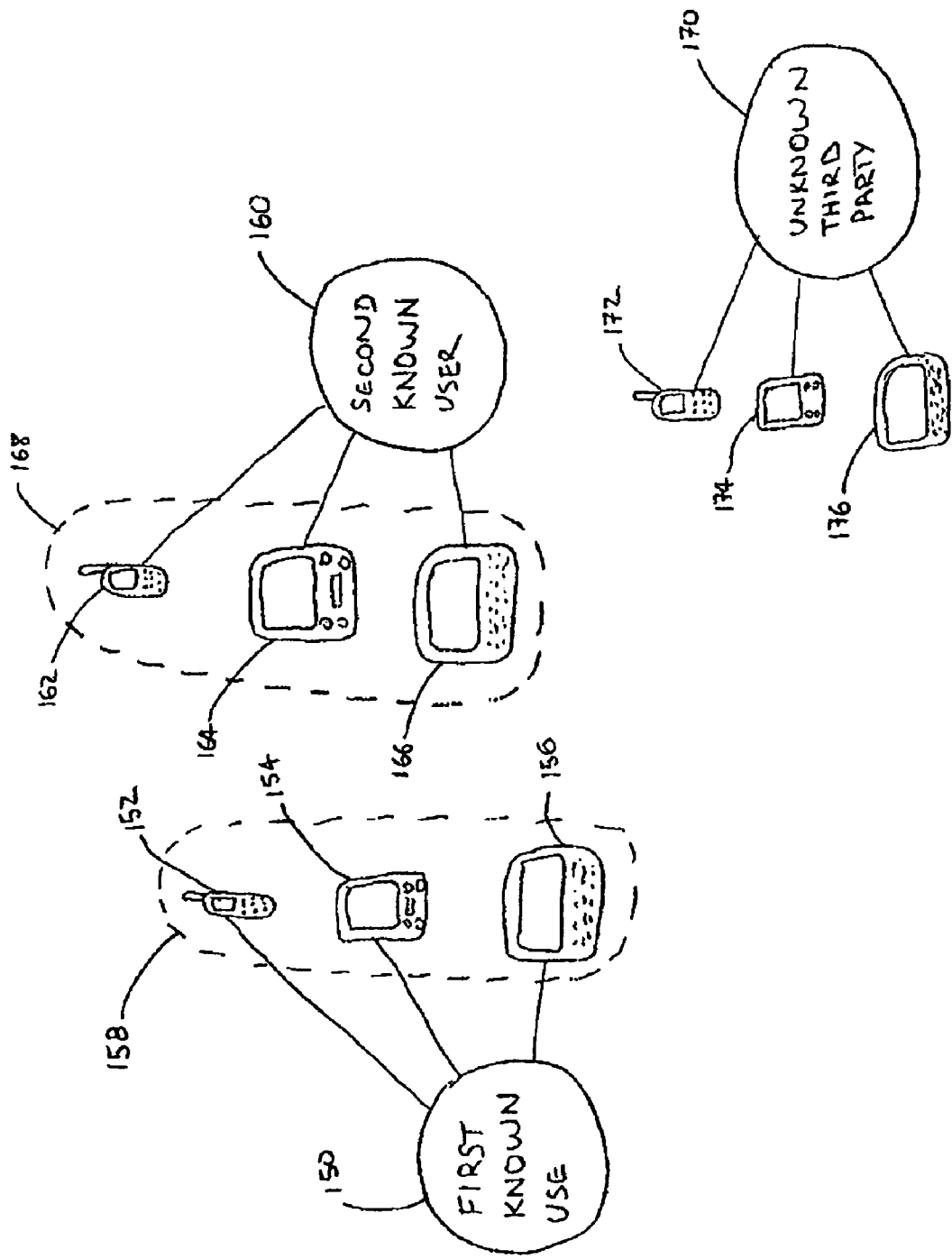
FIG. 3 shows the relationships between 3 parties—2 known users and an unknown third party—and their respective hand held devices.

The bonding process among a plurality of potential users and users' devices is illustrated in FIG. 3. FIG. 3 shows a first known system user 150. The first known system user 150 has a first cell phone 152, a first PDA 154 and a first wireless email terminal 156, or some other combination of hand held devices compatible with system 100 and capable of communicating with the control module 102 over the wireless communications link 118. Collectively the first cell phone 152, the first PDA 154, and the first wireless email terminal 156 form the first user's device set 158. FIG. 3 also shows a second known system user 160. The second known system user 160 has a second cell phone 162, a second PDA 164, and a second wireless email terminal 156, or some other combination of hand held devices compatible with system 100 and capable of communication with the control module 102 over the wireless communication link 118. Collectively the second cell phone 162, the second PDA 164, and the second wireless email terminal 166 form the second user's device set 168. The central control module 102 stores an association between the first user and each of the individual devices in the first known user's device set 158. The central control module 102 likewise stores an association between the second known user 160 and each of the individual devices in the second known user's device set 168. When the central control module 102 receives indication that the first user is present and desiring to use system 100, the central control module bonds to those devices in the first known user's device set 158 which are present at the time, to the exclusion of all other devices. Similarly, when the central control module 102 receives indication that the second known user 160 is present and desiring to use system 100, the central control module 102 determines which of the devices in the second known user's device set 168 happen to be present and bonds with them, again to the exclusion of all other compatible hand held devices that may happen to be present.

FIG. 3 also shows an unknown third party 170. The unknown third party may also have a cell phone 172, a PDA 174, and a wireless email terminal 176, or some other combination of external mobile devices which may be compatible with the system 100, and which may be capable of communicating with the control module 102 over the wireless link 118. The unknown third party 170 may be a one time or occasional passenger in the vehicle in which the system 100 is installed, but who otherwise has no real connection to the vehicle or with the system 100. The control module 102 has stored no associations between the unknown third party 170 and the unknown third party's cell phone 172, PDA 174, or wireless email terminal 176. Accordingly, even though the unknown third party's hand held devices may be capable of communicating with the system 100 over the wireless link 118, the control module 102 will not bond with the third party's devices because the central control module has not stored an association between the third party and the devices. The control module 102 will only bond with the compatible hand held devices associated with known users. Such bonding will occur only after the control module 102 receives indication that the user is present and desiring to use the system 100. Of course, the system 100 can learn new users and form new associations between the new users and their respective device sets. All that is required is to repeat the bonding process outlined in the flowchart of FIG. 2 for each new user and the devices in each new user's device set.

According to an embodiment, the central control module 102 receives indication of a user's presence via a vehicle's remote keyless entry (RKE) system. As shown in FIG. 1, a vehicle's RKE system 132 may be integrated with the vehicle's communications bus 116. The RKE system may be either a manual or passive system. In a manual system, the user unlocks the vehicle by pressing an "unlock" button such as button 136 on an RKE key fob 134. The key fob 134 sends a wireless RF signal to the RKE system 132. The RF signal includes a unique code identifying the key fob 134. When the RKE system receives the RF signal from the RKE key fob 134, it checks the received signal for the identification code to determine whether the key fob 134 is the proper fob for unlocking the vehicle. If so, the RKE system unlocks the vehicle. A passive system works in much the same way, except that the passive RKE system reacts to the presence of the key fob when the user bearing the key fob pulls on the door handle or presses a pushbutton in conjunction with pulling on the door handle.

The RKE system 132 may include multiple fobs capable of unlocking the vehicle. For example, a two driver family may require two fobs, one for each driver. Furthermore, the RKE system 132 may be configured to recognize two distinct identification codes, each identifying a separate fob. Each of the distinct identification codes may be associated with a different driver. When the RKE system 132 receives a code from one of the fobs, the RKE system 132 may forward the received ID code to the central control module 102 via the vehicle's communications bus 116. The central control module 102 may store an association between the RKE identification codes and specific users of the personal information management system 100. Based on which code is received, the central control module 102 may determine which of the two drivers is present. If the received code indicates that the first user 150 (FIG. 2) unlocked the vehicle, the central control module 102 will attempt to bond with the hand held devices in the first user's hand held device set 158. In contrast, if the received ID code indicates that the second user unlocked the vehicle, the central control module 102 will attempt to bond with the devices in the second user's hand held device set 168. In other words, the central control module 102 will attempt to bond with the mobile device set associated with the driver identified by the coded signal received from the RKE key fob 134.

Alternatively, system 100 may rely on other mechanisms for identifying the presence of various users and determining which set of mobile devices to bond with. For example, a user could be required to enter a numerical code into a keypad device, or a voice recognition system may be employed to identify a user based on speech recorded by the microphone 110. Retinal scanners, finger print readers or other biometric measuring devices may be used to identify users. In any case, once the user has been properly identified, the central control unit 102 will send a query over communication link 118 to determine which devices in the identified user's compatible device set are present. The central control module 102 will then bond only with the compatible hand-held devices associated with the identified user which happen to be present.

Once the central control module 102 has bonded to the user's compatible device set, the personal information management system 100 can be used to access data stored on the various hand held devices within the user's compatible device set and control the operation of the various devices through the single common interface 104. Furthermore, the interface 104 and the on board data storage device 128 in the central control module 102 allow the user to interact with and control the hand held devices in the user's compatible device set in ways that are more convenient for a person driving a vehicle than would otherwise be the case if the user were attempting to use the devices directly.

In addition to voice communications, many cellular phones are adapted to send and receive Short Message Service (SMS) text messages. System 100 of the present invention may be adapted to command a cellular phone 120 to send SMS text messages up to, for example, 160 characters long. According to this aspect of the invention, preset messages may be stored on the data storage device 128 in the central control module 102. The text messages may be generated and modified in advance using a text editor. The text editor may be a function run on a PDA or some other external device enabled to communicate with the central control module 102 over the wireless link 118. The cell phone 120 itself, for example, may have a text editor on which to compose SMS messages. Once text messages are complete, they can be transferred from the mobile editing device to the central control module 102 via the wireless link 118. The central control module 102 stores the messages on the data storage device 128. A user may access the pre-stored messages at a later time through the interface 104. Using input commands entered either through the microphone 110 or the multi-function switch 108, the user can cause the pre-stored messages to be displayed on the visual display 106. The user may then scroll through the pre-stored messages, select a desired message and select a recipient to send the message to from the user's contact list.

Figure 4:
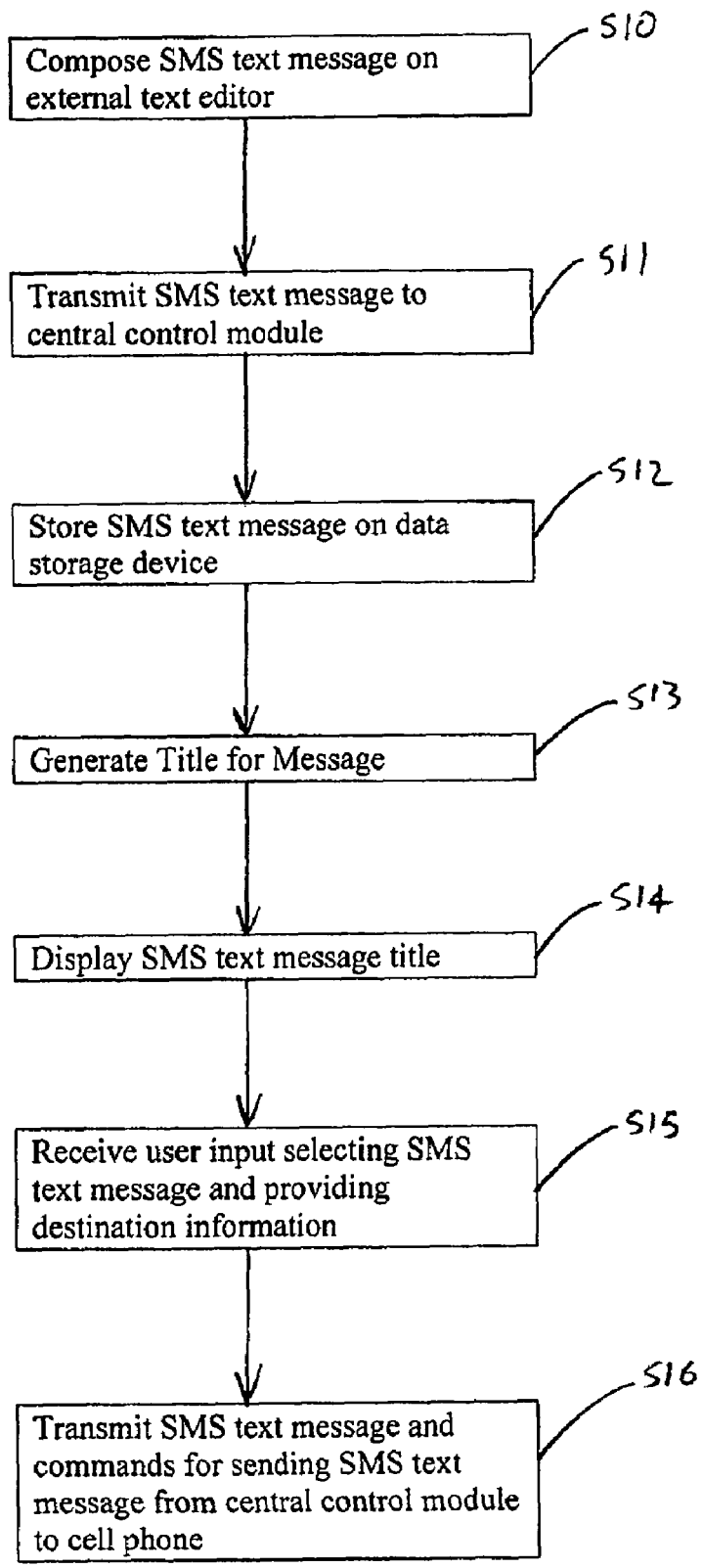
FIG. 4 is a flow chart showing the acts for creating and sending an SMS text message using the personal information management system of the present invention.

Sending the text message is similar to initiating a telephone call using the cellular phone 120. An application program on the central control module 102 causes the control module 102 to send commands and data to the cellular phone 120 over the wireless link 118. The commands and data sent over the wireless link 118 include instructions to send the desired text message to the selected recipient. A short time later the recipient receives the text message over the cellular network. FIG. 4 is a flow chart showing the process for creating and sending SMS text messages using the personal information management system of the present invention. The first act S10 is to compose an SMS text message using an external text editor such as found on a PDA or other external electronic device. The second act S11 is to transmit the composed message from the text editor to the central control module 102 of the personal information management system 100. In act S12 the SMS text message is stored on the data storage device 128 in the central control module 102. A title is generated for the saved message according to a message naming convention, or the user selects a name for the saved message. The message title is displayed on the interface display device in act S14. The user selects the SMS text message in act S15 along with providing destination information defining where the message is to be sent. In act S16 the SMS text message is forwarded to the user's cell phone along with commands instructing cell phone to send the text message to the designated recipient. The cell phone then sends the message.

System 100 may also receive and display SMS text messages received over the cellular network. In this case, as with receiving cellular telephone calls, the personal information management system 100 merely acts as an extension of the cellular telephone 120. The cell phone 120 receives SMS text messages as under normal conditions, but in this case it forwards them to the control module 102 over the wireless communication link 118. The received message may be displayed immediately on the visual display 106 or the message may be saved on the data storage device 128 with an alarm sounded or a symbol displayed by the interface 104 to indicate that a new message has been received. The central control module 102 may support text to speech synthesis. In this case, the message could be read to the user over the speakers 112.

One feature of system 100 may be that the microphone 110 and the central control module's data storage capabilities may be used to record voice messages for later use. Such recordings can serve as audio memos or reminders that can be replayed any number of times. An audio memo record function can be selected from the multi-function switch 108 of the user interface 104. The user may then speak into the microphone 110 to record an audio message. The CPU 126 converts the recorded sounds into an audio wav file which is stored in the data storage device 128. The message may be named according to a generic naming format, such as message 1, message 2, etc. or a message title might be entered by the user at the beginning or end of the recording process. Message titles may then be listed on the visual display 106 where they can be selected through the multi-function switch 108 or voice commands entered into the microphone 110, for playback over the speakers 112. This aspect of system 100 allows the user to record thoughts, and to leave the equivalent of audio memos to oneself, alleviating the need for pen and paper reminders. Accordingly, the user can leave notes as well as review previously recorded notes without diverting his or her attention from other activities, as would be necessary to leave and or review manually written notes and reminders.

Figure 5:
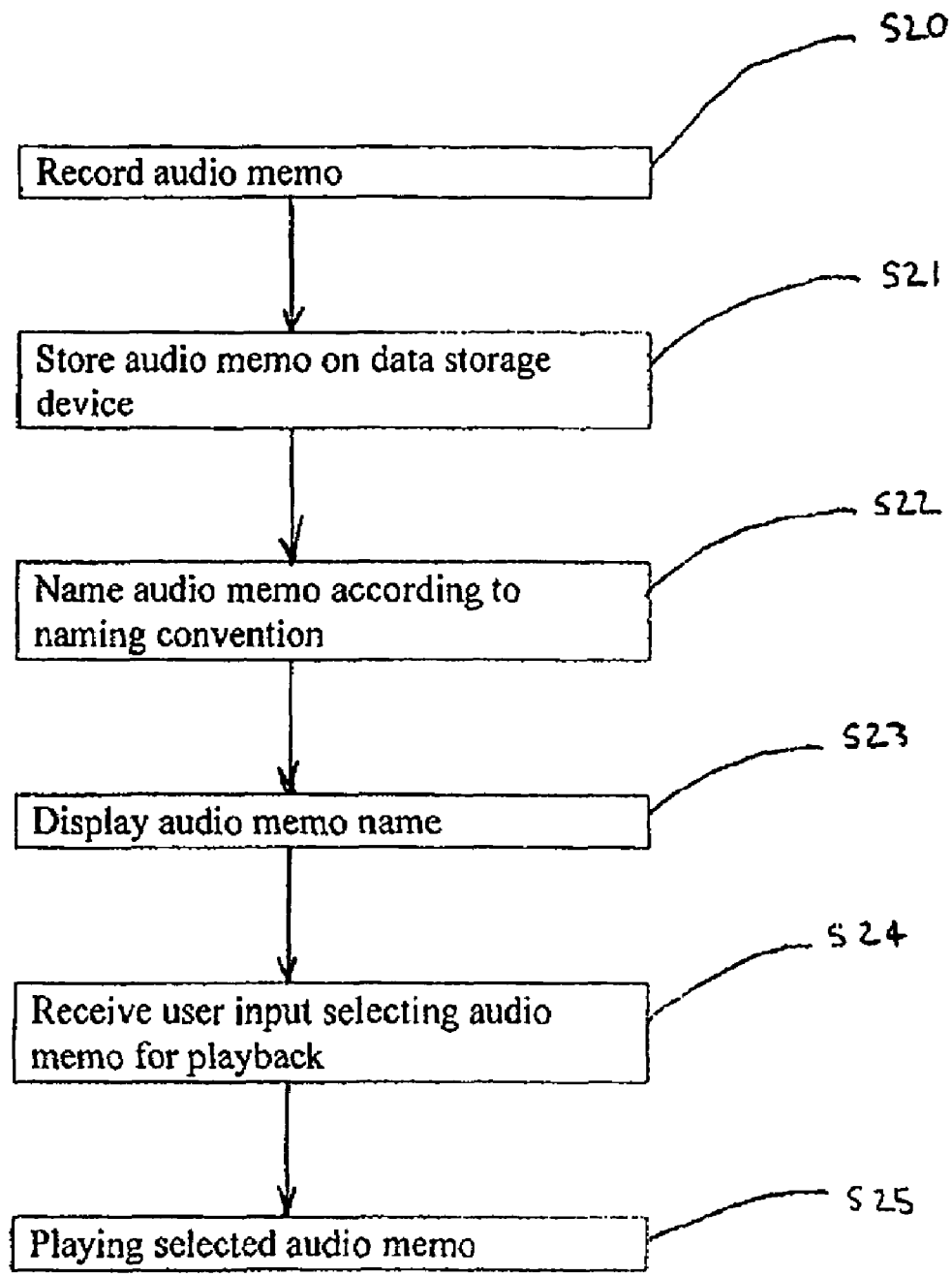
FIG. 5 is a flow chart showing a process for creating and storing an audio memo using the personal information management system of the present invention.

FIG. 5 is a flow chart showing a process for recording and playing back an audio memo on the personal information management system 100 of the present invention. The first act S20 is to record the audio memo. The user may accomplish this by selecting a record function via the function selector switch 108 of the user interface 104. The user then speaks into the microphone 110 to record the audio memo. The central control module converts the recorded signal into an audio wave file and stores the audio memo on data storage device 128 in act S21. In act S22 a name is assigned to the recorded memo according to a standard audio memo naming convention or a unique name is assigned by the user. At some future time, generally in response to an input selection by the user, the name of the stored audio memo is presented to the user at act S23. At act S24, an input from the user is received indicating the user desires to hear the audio memo. At act S25 the audio is played back for the user, typically over the speakers 112. Thus, a user may conveniently record thoughts and ideas without resorting to pencil and paper, and may access such recorded thoughts as often as desired, without having to read any text and averting his or her eyes from another task-like piloting the vehicle in heavy traffic.

Figure 6:
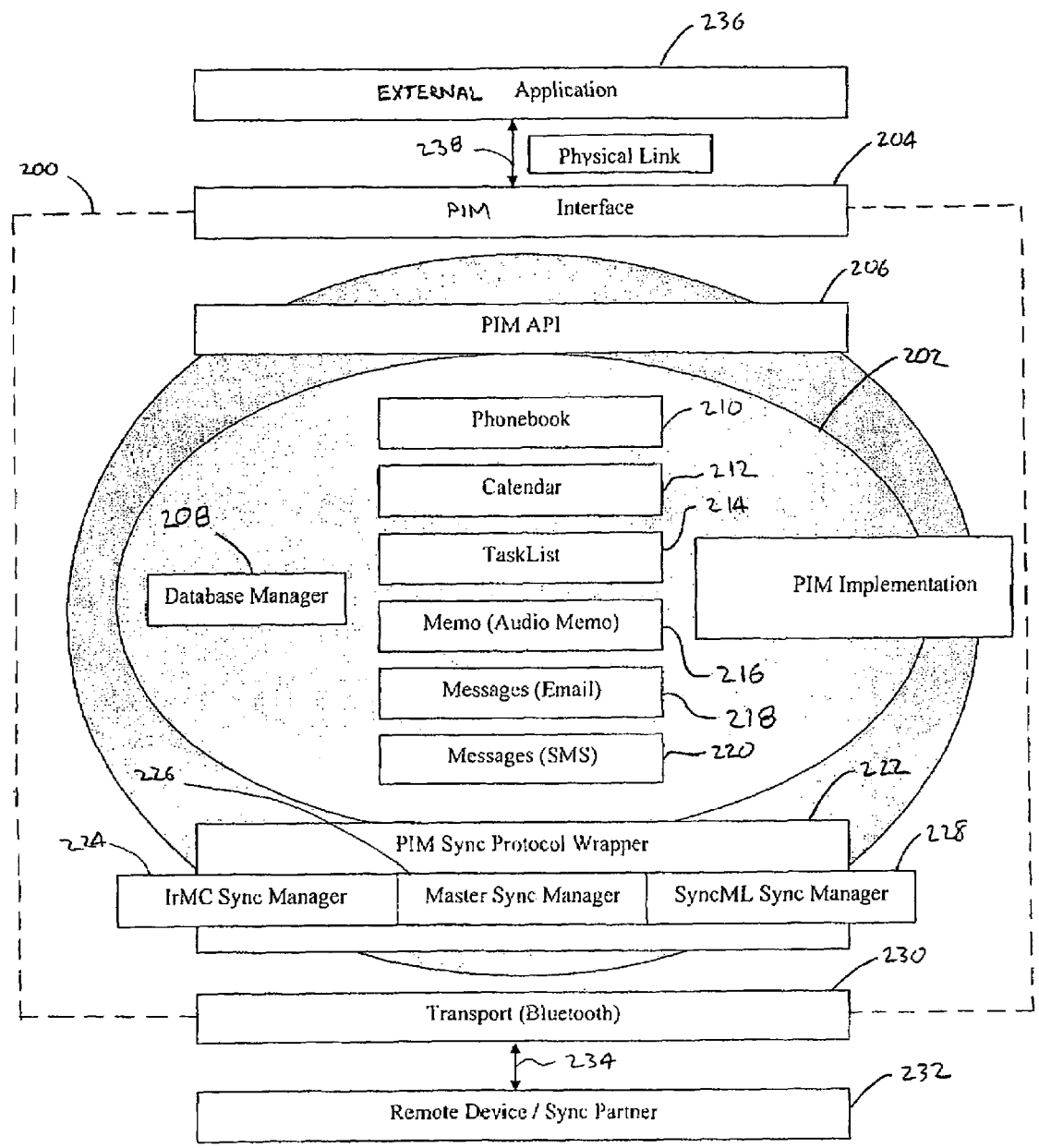
FIG. 6 is a block diagram of a Central Control Module of a personal information management system according to the invention.

An embodiment of a PIM (personal information management) system Central Control Module 200 is shown in FIG. 6. The Central Control Module 200 is adapted to interface with an external application 236 such as an automobile's onboard computer system or navigation system, or some other application that includes an input/output interface for receiving input commands from a user and presenting messages and other data to the user. The Central Control Module 200 is also adapted to interface with a plurality of remote mobile devices/sync partners 232. The Central Control Module 200 includes a database 202 for storing a user's personal information. According to the embodiment shown, the database is organized into a Phonebook 210 for storing telephone numbers in the other contact information; a Calendar for storing important dates, appointments, and the like; a Task List 214; a Memo Storage Area 216 for storing audio memos; a first Message Storage Area 218 for storing e-mail messages; and a second message storage area 220 for storing SMS text messages. A Database Manager 208 manages the database, storing and retrieving user data in response to commands received from the external application 236.

The external application 236 provides the human interface for entering commands, displaying information, and controlling the remote mobile devices 232. The Central Control Module 202 interfaces with the customer application 236 through a physical link 238. The physical link 238 may be a hard wired serial connection, a vehicle's electronic communications bus, or the like. The PIM module 202 includes a physical interface 204 for providing a connection between the Central Control Module 200 and the physical link 234 to the external application 236. The Central Control Module 200 further includes a PIM application programming interface (API) 206. The PIM API 206 interprets and executes commands received from the external application 236 received over the physical link 238. The PIM API 206 packages data appropriately for sending the data to the external application 236 for presentation to the user and parses data received from the external application 236 for storage in the database 202.

At the opposite end, the PIM Central Control Module 200 interacts with the Remote Devices/Sync Partners 232 via the wireless link 234. A wireless transport module 230 provides the wireless link to external mobile devices. The wireless transport module 230 may be for example a Bluetooth wireless transport module. The wireless transport module 230 allows data and commands to be transferred between the Central Control Module 200 and the Remote Devices/Sync Partners 232. A PIM Sync Protocol Wrapper 222 is provided for managing the synchronization of user data between the Central Control Module 200 and the Remote Devices/Sync Partners 232. The PIM Sync Protocol Wrapper 222 implements a plurality of synchronization protocols for communicating with the various Remote Devices/Sync Partners 232, each of which may implement a different synchronization protocol. For example, the PIM Sync Protocol Wrapper 222 includes an IrRMCsync Manager 224, a Master Sync Manager 226, and a SyncML Manager 228. As will be described in more detail below, when a synchronization function is initiated, the PIM Sync Protocol Wrapper 222 identifies which sync protocol must be employed to sync with a given remote device/sync partner 232. The PIM Sync Protocol Wrapper 222 then issues the appropriate commands for initiating the synchronization process with the remote device/sync partner 232. The synchronization commands are then sent to the remote device/sync partner 232 via the wireless link 234. Upon receiving the synchronization commands over the wireless link 234, the remote device/sync partner 232 accesses the appropriate user data stored on the remote device/sync partner 232 and transmits the data back to the Central Control Module 200 via the wireless link 234. The PIM Sync Protocol Wrapper 222 parses the received data and maps it to the appropriate portion of the Central Control Module's database 202.

Figure 7:
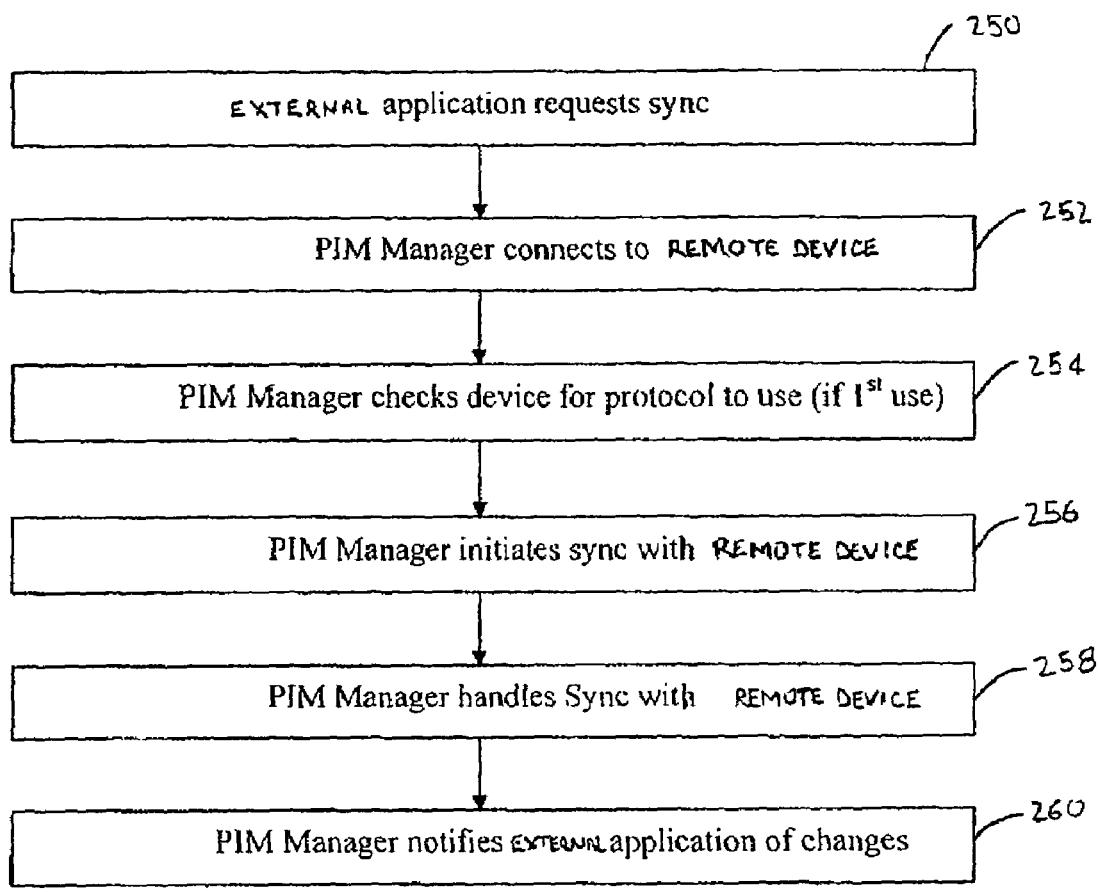
FIG. 7 is a flow chart showing a method of synchronizing data between a central control module and a remote external device.

FIG. 7 shows a flow chart of the data synchronization process. The data synchronization process begins when the external application 236 initiates a sync request at 250. The sync request may be initiated by a user input entered into the external application interface, or automatically by the external application 236 under predefined circumstances, such as after a predefined time lapse since the previous sync operation, or each time a vehicle is started, and so forth. The Central Control Module 200 receives the synchronization request and connects to the remote device/sync partner 232 over the wireless link 234 at 252. Once the Central Control Module 200 establishes communications with the remote device/sync partner 232, the PIM sync protocol wrapper 222 determines at 254 which protocol must be used to sync with the particular remote device/sync partner 232 at 256. The PIM sync protocol wrapper 222 initiates the sync process with the remote device/sync partner at 256. The PIM Central Control Module 200 manages the sync process at 258. Managing the sync process essentially entails sending the appropriate commands to the remote device/sync partner 232 to retrieve the appropriate data from the remote device/sync partner 232 and storing the data received from the remote device/sync partner 232 in the appropriate area of the database 202. The database manager 208 determines whether new data or changes to existing data have been received and notifies the external application of any changes at 260.

Figure 8:
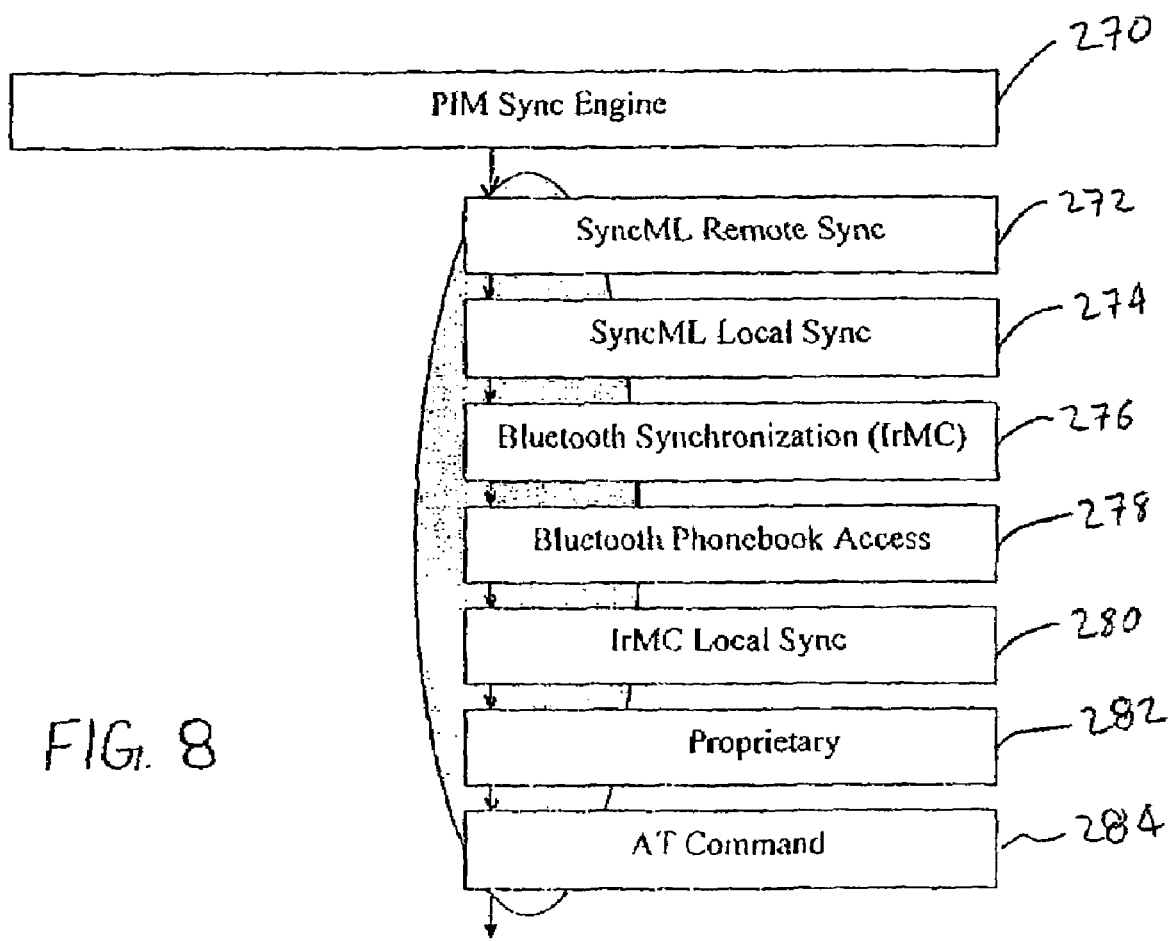
FIG. 8 is a block diagram showing a synchronization protocol selection algorithm.

FIG. 8 illustrates a protocol identification algorithm for determining the appropriate sync protocol to be used during the sync operation. The first time that the Central Control Module 200 syncs with a particular remote device/sync partner 232, a PIM Sync Engine 270 interrogates the remote device/sync partner 232 to determine which synchronization protocol may be used to sync with the device. The PIM sync engine 270 steps through a hierarchy of preferred sync protocols to determine the most preferred synchronization protocol that is supported by the remote device/sync partner 232. As shown in FIG. 8, the PIM sync engine 270 first attempts to sync using the SyncML Remote Sync protocol 272. If this sync protocol is not supported by the remote device/sync partner 232 the PIM sync engine 270 next attempts to sync using the SyncML Local protocol 274. The PIM sync engine 270 continues to step through the sync protocol hierarchy until the first protocol within the sync protocol hierarchy supported by the remote device/sync partner 232 is found. Thus, if neither the SyncML Remote Sync nor SyncML Local Sync protocols are supported by the remote device/sync partner 232, the PIM sync engine 270 successively steps through the Bluetooth Synchronization (IRMC) 276; Bluetooth Phone Book Access 278 IrMC local sync 280; a custom sync protocols 282 unique to the particular remote device/sync partner 232; AT Command protocol 284; and so forth. The PIM Sync Engine attempts to sync using successively less desirable sync protocols until a synchronization protocol that is supported by the remote device/sync partner 232 can be found. Once the sync engine 270 identifies the most desirable sync protocol supported by the remote device/sync partner 232, the PIM sync engine 270 saves this information so that the next time a sync operation is initiated with the particular remote device/sync partner 232, the PIM sync engine 270 may employee the appropriate sync protocol immediately.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A personal information management system for interacting with and controlling one or more external mobile devices, the system comprising:
    a central control module having a data storage to store an association between a first user and a first external mobile device set;
    an input device to identify the first user; and
    a wireless communication module to communicate control and data signals between the central control module and the first external mobile device set;
    the input device being configured to communicate the identity of the first user to the control module so that when the input device verifies the presence of the first user, the control module seeks to communicate with and control one or more external mobile devices of the first external mobile device set to the exclusion of other external mobile devices.

2. The personal information management system of claim 1 wherein the input device comprises a remote keyless entry system which verifies the presence of the first user by receiving a coded identification signal from a remote keyless entry system key fob.

3. The personal information management system of claim 1 wherein the control module stores an association between a second user and a second external mobile device set, the input device being configured to communicate the identity of the second user to the control module so that when the input device verifies the presence of the second user, the control module seeks to communicate with one or more external mobile devices comprising the second external mobile device set to the exclusion of other external mobile devices.

4. The personal information management system of claim 3 wherein the control module sends a wireless query to each external device in the second external mobile device set when the input device verifies the presence of the second user, and establishes a communication link with each external mobile device in the second external mobile device set that responds.

5. The personal information management system of claim 1 wherein the input device comprises a biometric reader adapted to identify a user based on unique biometric data.

6. The personal information management system of claim 1 wherein the communication module comprises a Bluetooth communication module.

7. The personal information management system of claim 6 wherein the control module sends a wireless query to each external mobile device in the first external mobile device set when the input device verifies the presence of the first user, and establishes a communication link with each external mobile device in the first external mobile device set that responds.

8. The personal information management system of claim 1 wherein the input device comprises a key pad for receiving a user entered identification code.

9. The personal information management system of claim 1 further comprising a central user interface, the central user interface allowing the first user to interact with and control each external mobile device in the first external mobile device set from a single interface.

10. The personal information management system of claim 9 wherein the user interface includes a function selector switch, a microphone, a speaker and a display device.

11. A personal information management system for use in a vehicle, the personal information management system comprising:
    a vehicular user interface that includes at least a microphone, a speaker and a display;
    a wireless communication module to communicate with external mobile devices; and
    a control module including a data storage, the control module configured to store audio data recorded by said microphone in the data storage, and selectively replay said audio data over the speaker in response to an input from a user.

12. The personal information management system of claim 11 further comprising an input device to identify a user, the control module configured to form associations between users and said stored audio data such that said stored audio data may be replayed only at the selection of a user who recorded the audio data.

13. A personal information management system comprising:
    a control module including a communication module to establish a wireless communication link between the central control module and an external mobile communication device;
    a database storage device to store one or more pre-recorded text messages; and
    an interface to store said pre-recorded text messages and to allow a user to select a pre-recorded text message to be transmitted via the external mobile communication device;
    whereby, when a user selects a pre-recorded text message to be sent, the control module causes the selected pre-recorded text message to be transmitted to the external mobile communication device over the wireless communication link with commands to the external mobile communication device for transmitting the pre-recorded text message.

14. The personal information management system of claim 13 wherein the one or more pre-recorded messages comprise Short Message Service (SMS) text messages.

15. The personal information management system of claim 14 wherein the external mobile communication device comprises an SMS enabled cellular telephone.

16. The personal information management system of claim 13 wherein the wireless communication link is further configured to establish a communication link with an external mobile device capable of acting as a text editor, the pre-recorded text messages being composed on the text editor and transferred to the control module via the wireless link.

17. The personal information management system of claim 13 wherein the pre-recorded text messages comprise email messages, the external mobile communication device comprises a wireless email terminal, and the commands for transmitting the pre-recorded text messages include an email address of a message recipient.

18. A central control module for a personal information management system, the central control module comprising:
- a first interface for providing a data link to an external application, the external application including a user interface;
- a second interface for communicating with a plurality of remote, mobile devices over a wireless link;
- a synchronization protocol manager in communication with the second interface and configured to extract data from said remote devices; and
- a database for storing data extracted from said remote devices.

19. The central control module of claim 18 wherein the synchronization protocol manager implements a plurality of synchronization protocols and a protocol identification algorithm for identifying the most appropriate synchronization protocol for synchronizing data with each individual remote device of said plurality of remote devices.

20. The central control module of claim 19 wherein said synchronization manager includes a hierarchical list of synchronization protocols, wherein the synchronization manager attempts to synchronize data with a remote device using a more favored synchronization protocol if possible, and implementing a less favored synchronization protocol if the more favored synchronization protocol is not supported by the remote device.

21. A method of synchronizing data between a first personal information storage device and a second personal information storage device, the method comprising:
- assembling a preferential list of synchronization protocols implemented on one of said first and second personal information storage devices;
- determining, in order of preference, whether a synchronization protocol implemented on the one of said first and second personal information storage devices is implemented on the other of said first and second personal information storage devices; and
- initiating a data synchronization function employing a synchronization protocol which is the most preferred synchronization protocol implemented on both the first and second personal information storage devices.

* * * * *